United States Patent
Black et al.

(10) Patent No.: US 8,983,250 B2
(45) Date of Patent: Mar. 17, 2015

(54) AWG FILTER FOR WAVELENGTH INTERROGATOR

(71) Applicants: Richard J. Black, Menlo Park, CA (US); Joannes M. Costa, Rancho La Costa, CA (US); Fereydoun Faridian, Atherton, CA (US); Behzad Moslehi, Los Altos, CA (US); Vahid Sotoudeh, Los Altos, CA (US)

(72) Inventors: Richard J. Black, Menlo Park, CA (US); Joannes M. Costa, Rancho La Costa, CA (US); Fereydoun Faridian, Atherton, CA (US); Behzad Moslehi, Los Altos, CA (US); Vahid Sotoudeh, Los Altos, CA (US)

(73) Assignee: Intelligent Fiber Optic Systems, Inc., Santa Clara, CA (US)

( * ) Notice: Subject to any disclaimer, the term of this patent is extended or adjusted under 35 U.S.C. 154(b) by 0 days.

(21) Appl. No.: 13/830,939

(22) Filed: Mar. 14, 2013

(65) Prior Publication Data

US 2014/0268155 A1    Sep. 18, 2014

(51) Int. Cl.
G02B 6/34    (2006.01)
G01J 3/02    (2006.01)

(52) U.S. Cl.
CPC .................................... *G01J 3/0229* (2013.01)
USPC ........................................................... 385/37

(58) Field of Classification Search
USPC ........................................................ 385/37
See application file for complete search history.

(56) References Cited

U.S. PATENT DOCUMENTS 7,903,907 B1 *    3/2011    Park et al. ..................... 385/12

* cited by examiner

*Primary Examiner* — Jerry Blevins
(74) *Attorney, Agent, or Firm* — File-EE-Patents.com; Jay A. Chesavage

(57) ABSTRACT

A wavelength interrogator is coupled to a circulator which couples optical energy from a broadband source to an optical fiber having a plurality of sensors, each sensor reflecting optical energy at a unique wavelength and directing the reflected optical energy to an AWG. The AWG has a detector coupled to each output, and the reflected optical energy from each grating is coupled to the skirt edge response of the AWG such that the adjacent channel responses form a complementary pair response. The complementary pair response is used to convert an AWG skirt response to a wavelength.

19 Claims, 5 Drawing Sheets

AWG FILTER FOR WAVELENGTH INTERROGATOR

The present invention was developed under NASA SBIR contract NNX11CG39P. The government has certain rights in the invention.

FIELD OF THE INVENTION

The present invention relates to a wavelength discriminator for fiber optic use. In particular, the present invention relates to arrayed waveguide grating (AWG) filter use in a wavelength interrogator.

BACKGROUND OF THE INVENTION

A wavelength interrogator typically uses a sine filter or other type of wavelength sensitive filter which has a monotonic response to a shift in incoming wavelength, with the wavelength interrogator coupled to a fiber Bragg grating (FBG) sensor, which may be place in series with other FBG sensors, each sensor having a corresponding wavelength discriminator. A limit is reached in such an architecture, where the number of sensors is limited by the number of sine filters in the interrogator.

Additionally, the sine filters are individual components, each of which is tuned to operate in a particular range of wavelengths. It is desired to provide a wavelength interrogator architecture where the number of sensors which may be deployed is not limited by the number of discrete sine filters or other filters which resolve wavelength into detector response in the interrogator.

OBJECTS OF THE INVENTION

A first object of the invention is an optical interrogator which uses an arrayed waveguide grating to perform wavelength discrimination.

A second object of the invention is a wavelength interrogator having a broadband source coupled to a circulator, the circulator transferring optical energy from the broadband source to a sensing optical fiber having a plurality of fiber gratings for sensing, each fiber grating operating in a unique wavelength range, reflected optical energy from the fiber gratings reflected back to the circulator, the circulator directing the energy to an AWG input port, each fiber grating returning optical energy in a skirt response region of a unique channel of the AWG, a unique channel of the AWG coupled to a detector, the adjacent detector responses of each AWG channel used to determine the response wavelength of an associated fiber sensor.

A third object of the invention is a wavelength interrogator having a plurality of broadband sources, each broadband source operative in a particular and unique wavelength range associated with a particular sensor string, the broadband sources coupled to a circulator which couples the optical energy from the broadband sources to a plurality of fiber sensor strings, each fiber sensor string having a plurality of fiber Bragg gratings responsive to wavelengths of one of the broadband sources, each fiber sensor string grating also generating a unique wavelength reflection for each sensor, the optical energy from the sensors returned through the circulator to an AWG having a plurality of channels, each channel coupled to a detector, the detectors of adjacent channels of the AWG used to determine the wavelength of a particular sensor in each particular broadband source response range.

SUMMARY OF THE INVENTION

An optical fiber with a plurality of sequential gratings is coupled to a circulator or directional coupler, such that the circulator or directional coupler receives broadband optical energy from the broadband source and couples the broadband optical energy to an optical fiber with the plurality of gratings operative as sensors having gratings. Reflected energy from the plurality of sequential gratings is directed through the circulator to the input of an array waveguide grating (AWG), which segregates each wavelength to a particular AWG output channel. The AWG grating responses and AWG response skirts are selected such that the grating response occurs in an AWG response skirt, and each channel of the AWG is coupled to an associated detector. Detectors for adjacent channels are measured for a response, and the combined response of two adjacent channels is used to determine the reflected wavelength for a particular sensor to perform wavelength interrogation which converts the measured detector output to the corresponding wavelength.

If sensor strings formed from sequential fiber Bragg gratings are placed in series, each sensor string responsive to one of a plurality of selectable sources, and each sensor of each string is operative in a unique wavelength range and used with an AWG which generates a wavelength aliasing (repeating) response, then a single AWG can be used, with each sensor string receiving excitation from a separate broadband source operative in the wavelength range of that particular sensor string. The present invention thereby provides simultaneous interrogation of a plurality n/2 of sensors using adjacent AWG channel detector responses in an AWG having n channels.

DETAILED DESCRIPTION OF THE INVENTION

AWG filters are widely used in telecommunications to provide unique wavelength response in a WDM (wavelength division multiplexing) system which assigns adjacent wavelengths to independent communication sessions, and the AWG filter is utilized because it has multiple adjacent filtered channels, each with a flat response in a filtering range, and a skirt response region adjacent to, and on either side of, the flat response region.

Figure 1:
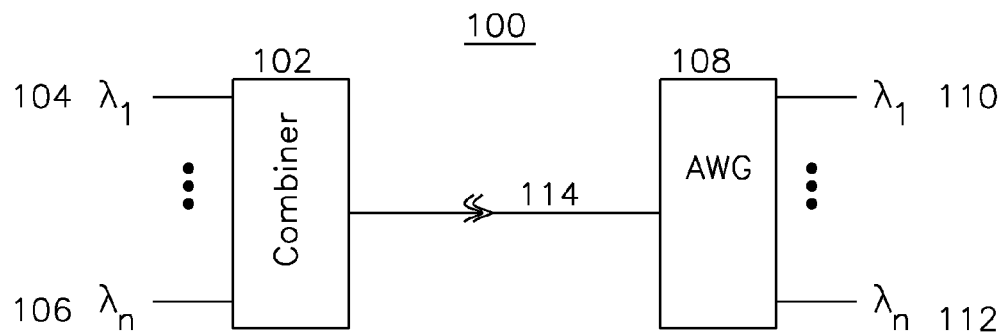
FIG. 1 is a block diagram of two AWG filters used in a communication link.

FIG. 1 shows a prior art AWG communication system. Individually modulated laser sources 104 at λ1 through 106 at λn modulate optical energy in distinct and non-overlapping wavelengths, such as an ITU wavelength grid. The wavelengths to be transmitted over a single fiber may be summed using a combiner 102, or an AWG for coupling the multiple sources at unique wavelengths to a single optical fiber 114 which carries the combined wavelength channel information to a remote station with AWG 108 for demultiplexing the wavelengths into individual wavelengths and channels 110 λ1 through 112 λn, each receive channel λ1 110 to λn 112 corresponding to the transmission channels λ1 104 through λn 108.

Figure 2:
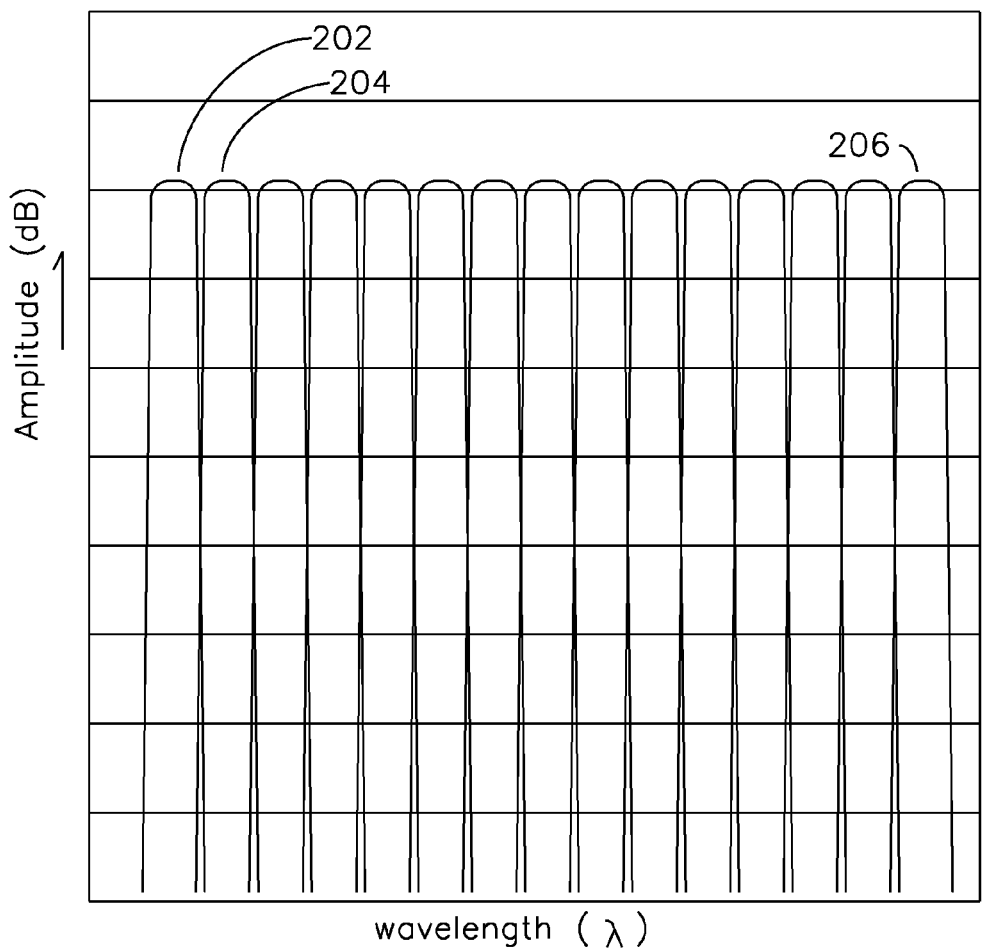
FIG. 2 is a plot of the wavelength response of the filter of FIG. 1.

FIG. 2 shows the wavelength response for the individual channels of the AWG filter. Channel 202 may correspond to λ1 104, channel 204 may correspond to λ2 204, and channel 206 may correspond to λn, with the maximum number of channels n equal to the number of channels of the AWG 108.

Figure 3:
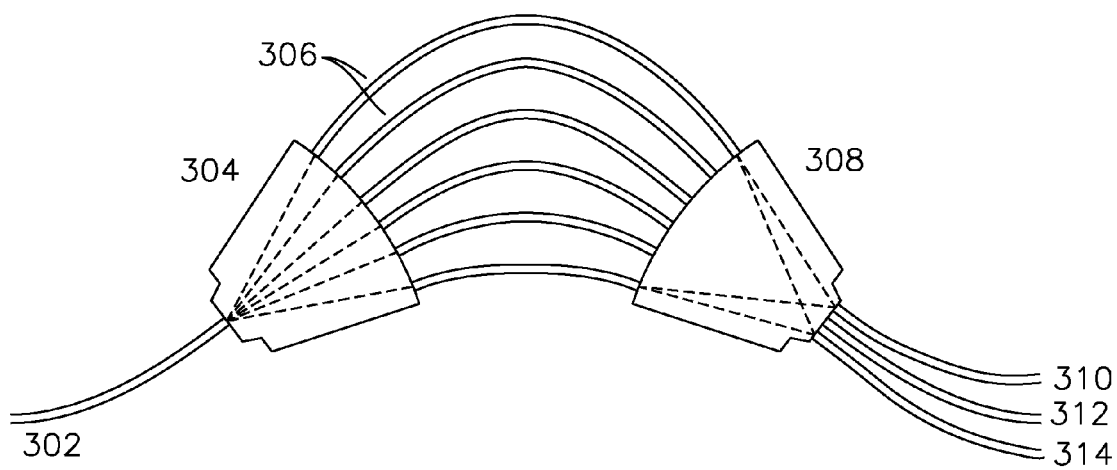
FIG. 3 is a schematic view of an AWG filter.

FIG. 3 shows a schematic view of a typical AWG. An optical fiber 302 carrying a plurality of wavelength channels of information is coupled to a star coupler 304, which directs the optical energy through an array of paths 306, each of which is slightly longer than an adjacent path, having a prism effect of spatially separating optical energy according to wavelength at the star coupler 308, which combines the optical energy with longer wavelengths directed to fiber 310 and optical energy having shorter wavelengths to fiber 314, and expandable to any number of fibers, although only three are shown for clarity. In practice, the AWG is fabricated using couplers 304, 308, and delay path array 306 on an integrated optical substrate, or is integrated with other system optical components on a single substrate, and FIG. 3 is provided only for illustration in understanding the operation of the AWG.

Figure 4:
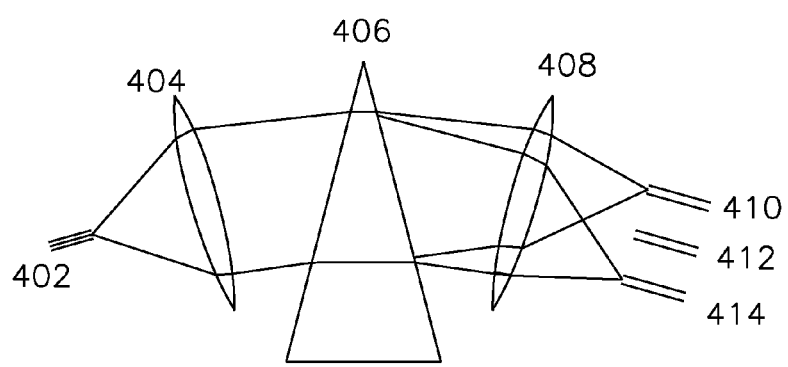
FIG. 4 is a diffraction optics equivalent to the AWG filter of FIG. 3.

FIG. 4 shows an optical analogy using lenses 404 and 408 and prism 408 which performs the path delay, separating the optical energy in input fiber 402 (analogous to input fiber 302 of FIG. 3) according to wavelength to output fibers 410, 412, 414, which are analogous to output fibers 310, 312, 314 of FIG. 3.

The AWG has optical properties which are useful for dense wavelength division multiplexing (DWDM) communications in adjacent channels, specifically a flat passband for wavelengths near the center response wavelength, and a drop cut-off skirt adjacent to the flat passband region. Because of their wide use in telecommunications systems which require a large number of channels on adjacent wavelengths, AWGs can be economical devices on a per-channel basis.

Figure 5:
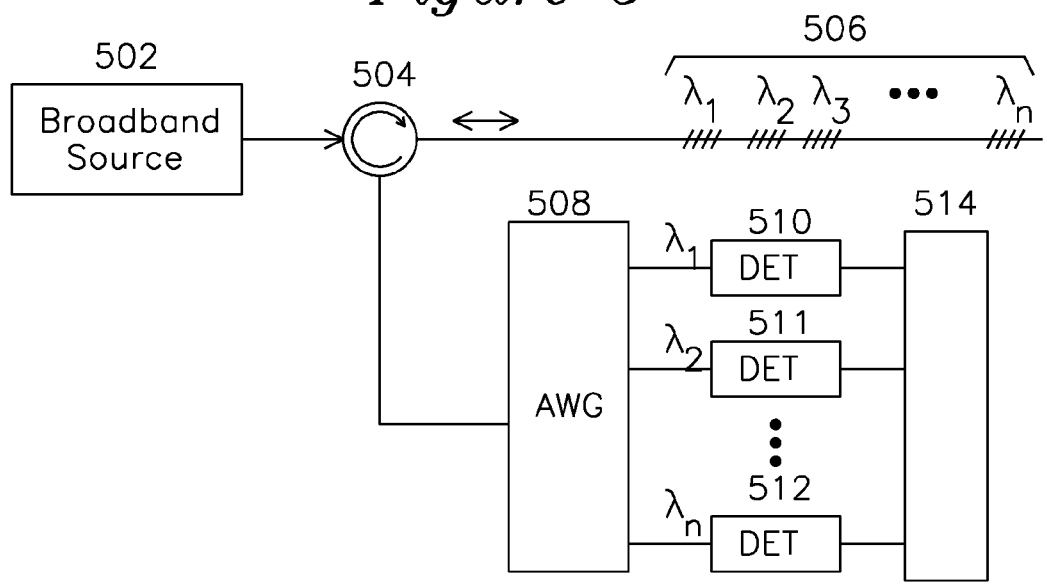
FIG. 5 is a block diagram of a wavelength interrogator for use with a plurality of gratings located on a single optical fiber.

FIG. 5 shows a wavelength interrogator according to one embodiment of the present invention. Broadband source 502 is coupled to a circulator 504 which transmits broadband optical energy to a sequential series of gratings 506 which are formed on an optical fiber. Each sequential FBG of sensor string 506 reflects energy at a particular wavelength back to circulator 504, and this reflected optical energy is directed by the circulator 504 to AWG filter 508 input, which segregates the optical energy from each channel into an individual output detector 510 through 512, and to wavelength detector 514 which compares detector responses to determine the wavelength based on detector response of each adjacent AWG detector pair. Each detector may be an amplitude sensing broadband response photodiode or phototransistor, or avalanche photodetector, or any optical detector which translates an optical input into an electrical response, such as may be converted using an A/D converter for use in a look-up table or other numeric processing. The sensor gratings 506 may be fiber Bragg gratings, Fabry-Perot gratings, or any other type of sensor which generates a change in reflected wavelength in response to a physical parameter change according to the sensor type, including but not limited to strain, temperature, or pressure.

Figure 6:
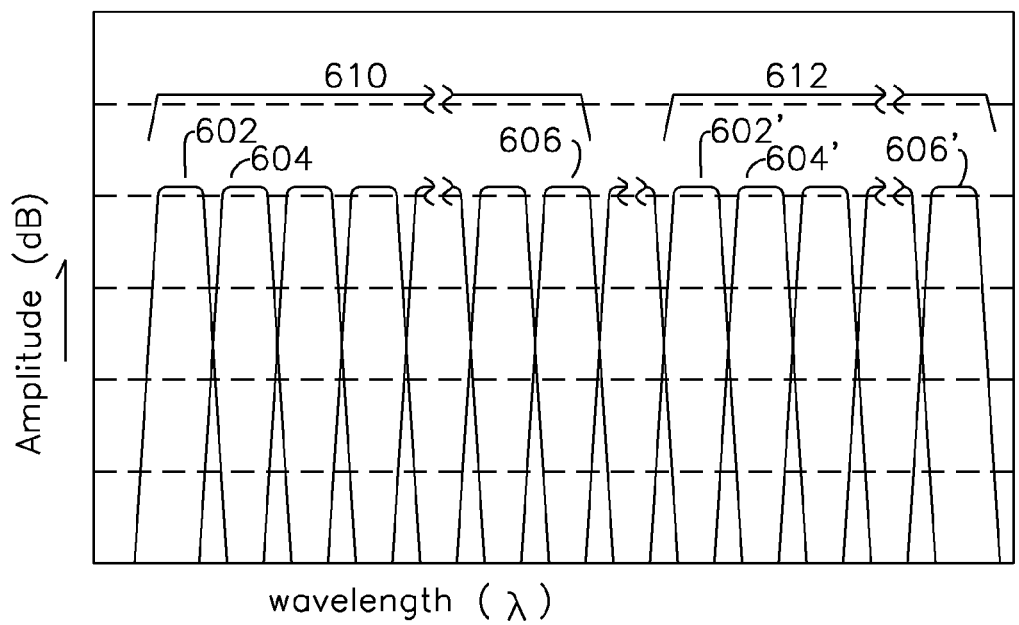
FIG. 6 is a plot of a wavelength discrimination for the interrogator of FIG. 5 and FIG. 9.

FIG. 6 shows the output response for the AWG filter, where λ1 detector 510 output may contain only the response of channel 602 shown in FIG. 6, and λ2 detector 511 output may contain only the response of channel 604, and so on through detector 512 response for λn of AWG channel 606. In one embodiment of the present invention, the FBG sensor responses fall in the skirt areas of the AWG response, rather than the passband where the filter is typically used, and the detector responses from adjacent skirt responses are used to discriminate the wavelength of applied wavelength. In this manner, n channels of AWG filter may be used in pairs to simultaneously interrogate n/2 FBG sensors.

Figure 7:
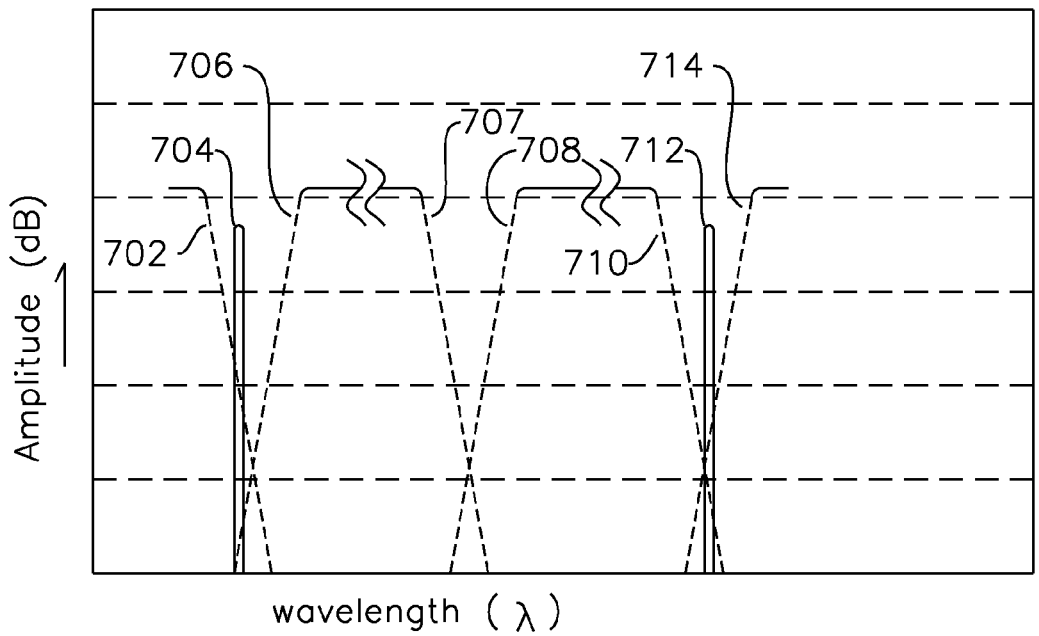
FIG. 7 is plot of AWG response for adjacent channels.

FIG. 7 shows a response such as from optical energy 704 reflected from a first FBG of sensor string 506 at λ1 and optical energy 712 reflected from a second FBG of sensor string 506 from λ2. 702 shows a skirt from one of the AWG channels and 706 is the skirt from an adjacent AWG channel which is part of an AWG channel response which extends to skirt 707 of the same AWG channel, with skirt 708 and 710 belonging to the next adjacent channel of the AWG. Each AWG channel has an associated detector 510, 511 through 512 as shown in FIG. 5, and the sensor grating wavelengths are selected such that optical energy is reflected back to the AWG falling between the two channels. By using the skirt responses of adjacent channels and with the FBG response in the skirt region of two adjacent channels, it is possible to determine the wavelength reflected by the FBG by examining the ratio of responses from the skirt responses of two adjacent channels. For example, reflected energy 704 from a sensor is measured by the response it generates in the detector coupled to the detector associated with the AWG channel having skirt 702 and the response in the detector coupled to the AWG channel having skirt 706. As the skirt 706 is also responsive to optical energy in skirt 707 for the same channel, the FBG sensors are selected such that optical energy reflected by a particular sensor is only present in one channel of the AWG at a time.

Figure 8:
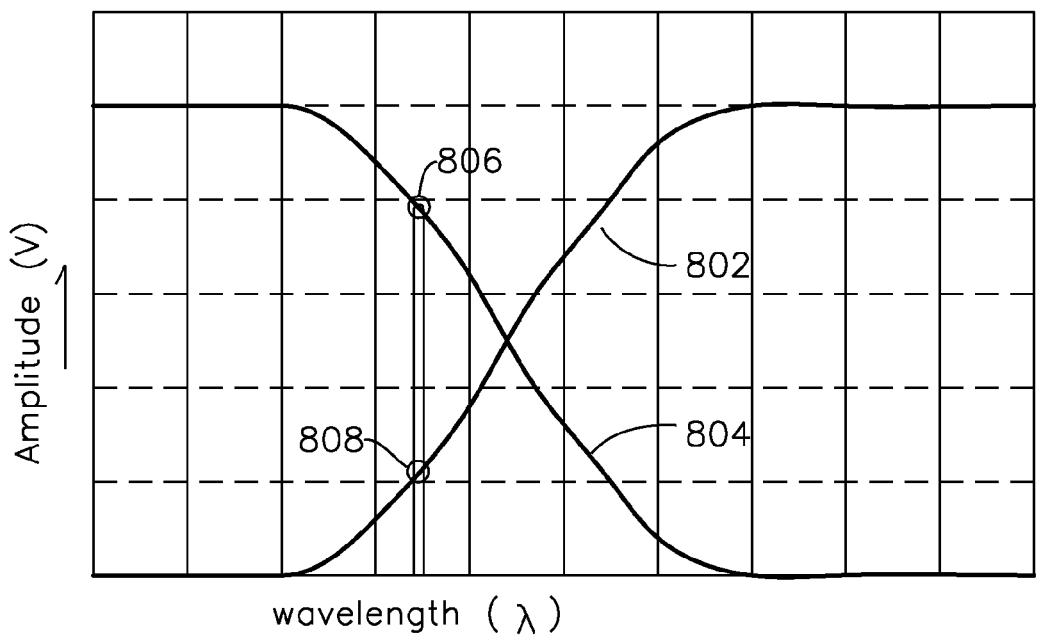
FIG. 8 is a plot of adjacent channel detector responses.

FIG. 8 shows another view of the reflected optical energy 704 of FIG. 7. In this example, detector response 806 corresponds to the lower channel 804 skirt (702 of FIG. 7) and detector response 808 corresponds to the upper channel 802 (706 of FIG. 7). By providing a mapping between relative channel response strength such as by using a look-up table of ratiometric responses, or by scaling the ratio of one detector to another based on a calibration, or by any other method for converting two detector responses into a wavelength response from previously characterized response of the AWG, it is possible to perform wavelength interrogation use the AWG with a detector on each adjacent AWG channel operating in the skirt region where one detector output is increasing while another is decreasing with change in detected wavelength, and with each sensor grating responding to a unique channel such that each channel has no more than one response from a sensor FBG generating a detector response.

Figure 9:
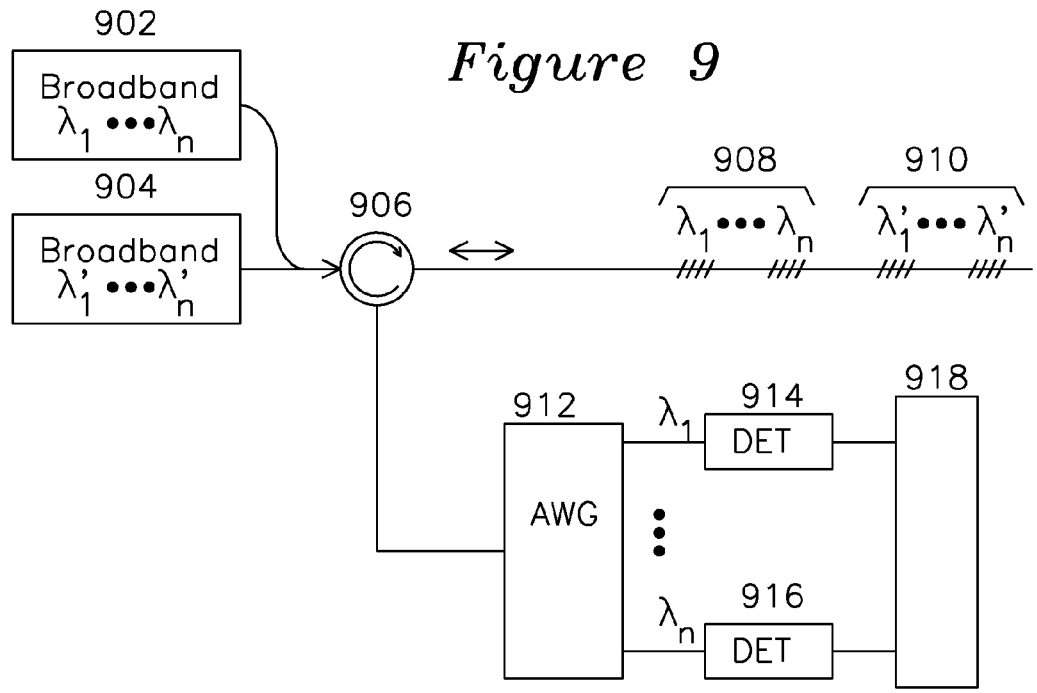
FIG. 9 is a block diagram for an interrogator using a single AWG with an aliasing response, and interrogating a plurality of sensor strings, each string operative in its own wavelength band, but using the same AWG for wavelength discrimination.

In another embodiment of the invention shown in FIG. 9, the repeating (aliasing) wavelength response of the AWG filter to wavelengths which are out of the design band is used for wavelength discrimination. FIG. 6 shows the repeating AWG response pattern with a first response excitation band 610, followed by a second (aliasing) response band 612. By choosing FBG sensor wavelengths of the sensor string in a first group which corresponds with excitation band 610, and placing in series with the first sensor string a second string of sensors in a second group which corresponds with excitation band 612, it is possible to provide an excitation source which exclusively excites the first string sensors in a first interval, followed by an excitation source which exclusively excites the second string sensors in a second interval, but read by the AWG as if they were in the first interval by using the AWG wavelength aliasing behavior. By commutating the sources 902 and 904, and using the same AWG filter, it is possible to discriminate an unlimited number of sensors using the same AWG adjacent channels, by relying on the selectivity offered by the source spectrum in combination with the aliasing response of the AWG sensor.

Accordingly, in one embodiment of the invention, the repeating response pattern of the AWG filter over regular wavelength intervals which exceed the range of wavelengths encompassed by the channels λ1 through λn is used to extend the use of the AWG filter to the aliased wavelengths. It is therefore possible to utilize a source which excites a first range of wavelengths λ1 through λn, and a second source which excites λ1' through λn', where the same AWG first channel is responsive to both λ1 and λ1' due to AWG aliasing, and the second AWG channel is responsive to both λ2 and λ2', etc, even though the wavelengths of the other FBGs λ1' through λn' are greatly separated from the original λ1 to λn. In this manner, a first string of FBG sensors 908 responsive to λ1 to λn may be placed in front of a second string of FBG sensors λ1' through λn', expanded to any number of FBG sensor strings or sensors per string, subject to the constraint that the AWG first channel be responsive to both λ1 and λ1', second channel responsive to λ2 and λ2', etc. In operation, source 902 is enabled, for example corresponding to range 610 of FIG. 6, which generates responses from FBG sensors of sensor string 908 read by AWG as previously described. Subsequently, source 904 is enabled, for example corresponding to range 612 of FIG. 6, which generates responses from FBG sensors of sensor string 910, which are directed to the same AWG 912 and read by the same detectors 914 through 916, and resolved as differential adjacent channel responses as was described for FIGS. 7 and 8, and the adjacent channel responses are resolved to wavelengths by wavelength resolver 918, which may use a formulaic relationship between wavelength and adjacent detector response, or it may use a look-up table, or any other method for discriminating wavelength from a known skirt characteristic. The invention thereby provides providing a high level of channel reuse for a fixed number of AWG channels.

Figure 9A:
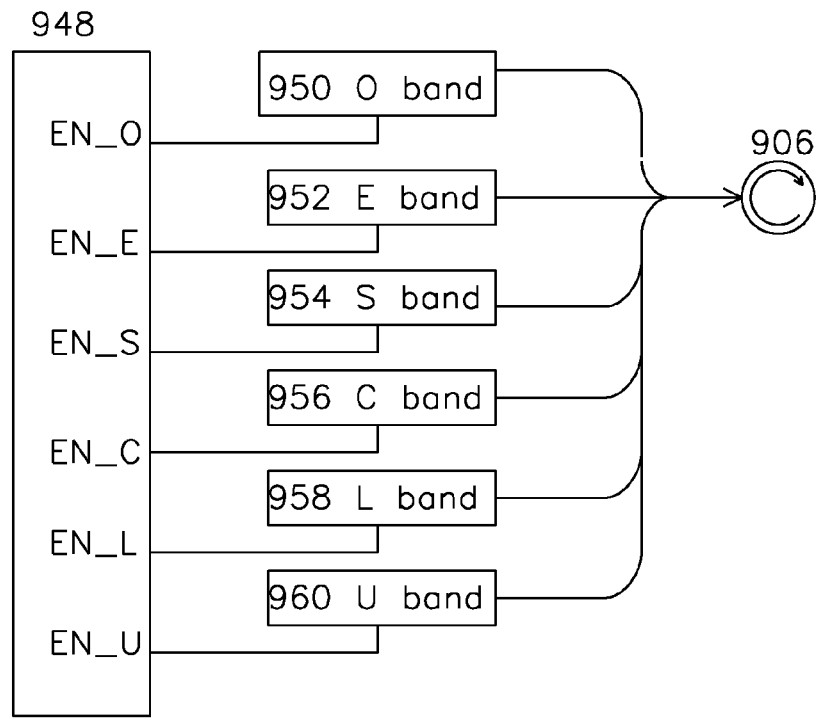
FIG. 9A is a block diagram for an alternative source generator for FIG. 9.

FIG. 9A shows an alternative source generation for a four-band system, using an O optical band (1260-1360 nm) source 950, E optical band (1360-1460 nm) source 952, S optical band (1460-1530 nm) source 954, C optical band (1530-1570 nm) source 956, L optical band (1565-1625 nm) source 958, and U optical band (1625-1675 nm) source 960. Each source can either be electrically enabled 948 in sequence, such as at a 1 Mhz rate, with each source enabled for 1 uS at a time, or any rate or in any order, as the associated sensor string will respond instantaneously, and the AWG channel will respond accordingly, with the wavelength resolver 918 utilizing the enabled source to determine which grating to associate the aliased (associated channel on a particular sensor string) AWG response. Using all of the 6 optical bands in succession, it is possible to provide a 6-way interleave of the sensors, where there are 6 sensor strings, each sensor string responsive to a particular band, and with a the adjacent AWG detector responses used in combination with enabled band information from the wavelength resolver 918. In one embodiment, the band controller 948 enables each band (or subset of bands) in succession by switching a power source for the source on at a high rate of speed, or alternatively, the source may be controllable using an optical beam switch such as a liquid crystal, silicon photonic crystal, MEMS shutter, mechanical shutter, or any method known in the art of electronic or mechanical laser switching.

We claim:

1. A wavelength interrogator having:
    an optical fiber having a plurality of gratings sequentially disposed on the optical fiber, each said grating forming a sensor and having a unique reflective optical response;
    a circulator having a sensor port coupled to said optical fiber, said circulator also having a broadband source port and an AWG port;
    a broadband source coupled to said circulator broadband source port, said circulator coupling optical energy from said broadband source to said optical fiber, reflected optical energy from each said grating directed through said circulator to said AWG port;
    an AWG coupled to said circulator AWG port, said AWG having a plurality of channels, each said channel coupled to a detector;
    whereby each said sensor provides reflected wavelength to an adjacent pair of said AWG channels, each said pair of AWG channels only receiving optical energy from a particular sensor;
    and where the detectors of said adjacent pair of said AWG channels generate a complementary response in the associated pair of detectors, thereby resolving said complementary response to a wavelength, at least one said sensor reflecting said broadband optical energy into an aliased AWG channel.

2. The wavelength interrogator of claim 1 where said gratings are fiber Bragg gratings (FBG).

3. The wavelength interrogator of claim 1 where said pair of AWG channels comprises the detector outputs of adjacent said AWG pairs.

4. The wavelength interrogator of claim 1 where said resolving complementary response is performed using a look-up table.

5. The wavelength interrogator of claim 1 where said resolving complementary response is performed using a formulaic relationship between said complementary detector responses.

6. The wavelength interrogator of claim 1 where at least one of said sensors is an FBG pressure sensor or an FBG strain sensor.

7. The wavelength interrogator of claim 1 where at least one of said sensors is an FBG temperature sensor.

8. The wavelength interrogator of claim 1 where at least one of said sensors converts a physical change into a wavelength change.

9. The wavelength interrogator of claim 1 where said broadband source includes a plurality of optical sources at different wavelengths, at least one said optical source operative in a non-aliased wavelength of said AWG and at least one said optical source operative in an aliased wavelength of said AWG.

10. The wavelength interrogator of claim 1 where one of said optical sources is operative in a non-aliased AWG channel wavelength for an interval of time which is exclusive of an interval of time when an aliased AWG channel wavelength of a different optical source is operative.

11. A wavelength interrogator having:
    a plurality of broadband optical sources, each said broadband source operative in a particular wavelength range;
    a plurality of string grating sensors, each said string grating sensor having a plurality of gratings operative in one of said particular wavelength ranges, each said grating sensor reflecting optical energy at a unique wavelength from other grating sensors;

said plurality of broadband optical sources coupled to a circulator, said circulator coupling said broadband optical sources to said plurality of string gratings sensors;

an AWG having an input coupled to said circulator and receiving reflected optical energy from one of said string grating sensors which receives optical energy from an associated one of said broadband optical sources;

said AWG having a plurality of outputs, each said output having a skirt region adjacent to a passband region, adjacent channel AWG outputs coupled to an optical amplitude detector;

where at least one wavelength resolution measurement is made by comparing the output of said adjacent channel AWG optical amplitude detectors and a corresponding measurement is made using reflected optical energy from one of said grating sensors which is operative in a skirt region of said AWG;

and where one of said plurality of broadband optical sources is enabled at a time during said wavelength resolution measurement;

where said AWG has an aliasing response such that at least one sensor from each said sensor string is operative in the skirt region of two adjacent AWG channels.

12. The wavelength interrogator of claim 11 where each of said broadband optical sources includes a filter to reduce the response from sensor gratings other than those associated with said broadband optical source.

13. The wavelength interrogator of claim 11 where said sensor gratings are fiber Bragg gratings (FBG).

14. The wavelength interrogator of claim 11 where said pair of AWG channels comprises the detector outputs of adjacent said AWG pairs.

15. The wavelength interrogator of claim 11 where said wavelength resolution measurement is performed using a look-up table.

16. The wavelength interrogator of claim 11 where said wavelength resolution measurement is performed using a formulaic relationship between said complementary detector responses.

17. The wavelength interrogator of claim 11 where at least one of said grating sensors is an FBG pressure sensor or an FBG strain sensor.

18. The wavelength interrogator of claim 11 where at least one of said grating sensors is an FBG temperature sensor.

19. The wavelength interrogator of claim 11 where at least one of said grating sensors converts a physical change into a wavelength change.

* * * * *

UNITED STATES PATENT AND TRADEMARK OFFICE
CERTIFICATE OF CORRECTION

PATENT NO. : 8,983,250 B2  
APPLICATION NO. : 13/830939  
DATED : March 17, 2015  
INVENTOR(S) : Black et al.

Page 1 of 1

It is certified that error appears in the above-identified patent and that said Letters Patent is hereby corrected as shown below:

In the specification

Replace the paragraph on column 1 line 4 with the following paragraph:

--This invention was made with Government support under N68335-07-C-0186 awarded by the Department of the Navy and NASA SBIR contract NNX11CG39P. The Government has certain rights in this invention.--

Signed and Sealed this  
Third Day of May, 2016

Michelle K. Lee  
*Director of the United States Patent and Trademark Office*